US006182042B1

(12) United States Patent
Peevers

(10) Patent No.: US 6,182,042 B1
(45) Date of Patent: Jan. 30, 2001

(54) SOUND MODIFICATION EMPLOYING SPECTRAL WARPING TECHNIQUES

(75) Inventor: Alan Peevers, Santa Cruz, CA (US)

(73) Assignee: Creative Technology Ltd. (SG)

( * ) Notice: Under 35 U.S.C. 154(b), the term of this patent shall be extended for 0 days.

(21) Appl. No.: 09/111,059

(22) Filed: Jul. 7, 1998

(51) Int. Cl.[7] .............................. G10L 15/12; G10L 19/02

(52) U.S. Cl. .......................... 704/269; 704/203; 704/205; 704/268; 704/500

(58) Field of Search .................................... 704/500, 501, 704/270, 203, 205, 241, 268, 269

(56) References Cited

U.S. PATENT DOCUMENTS

| | | | | |
|---|---|---|---|---|
| 3,649,765 | | 3/1972 | Rabiner et al. | 179/15 A |
| 3,816,664 | | 6/1974 | Koch | 704/503 |
| 3,982,070 | | 9/1976 | Flanagan | 179/1 |
| 4,020,291 | | 4/1977 | Kitamura et al. | 179/15.55 |
| 4,051,331 | | 9/1977 | Strong et al. | 179/107 |
| 4,246,617 | | 1/1981 | Portnoff | 360/32 |
| 4,384,335 | | 5/1983 | Duifhuis et al. | 364/513 |
| 4,464,784 | | 8/1984 | Agnello | 381/61 |
| 4,559,602 | | 12/1985 | Bates, Jr. | 364/487 |
| 4,591,928 | | 5/1986 | Bloom et al. | 360/13 |
| 4,700,391 | | 10/1987 | Leslie, Jr. et al. | 704/211 |
| 4,792,975 | | 12/1988 | McKay | 381/34 |
| 4,809,332 | | 2/1989 | Jongman et al. | 381/43 |
| 4,829,574 | | 5/1989 | Dewhurst et al. | 704/236 |
| 4,856,068 | | 8/1989 | Quatieri, Jr. et al. | 381/47 |
| 4,864,620 | | 9/1989 | Bialick | 381/34 |
| 4,885,790 | | 12/1989 | McAulay et al. | 381/36 |
| 4,937,873 | | 6/1990 | McAulay et al. | 381/51 |
| 4,941,178 | * | 7/1990 | Chuang | 381/41 |
| 5,054,072 | | 10/1991 | McAulay et al. | 381/31 |
| 5,111,505 | | 5/1992 | Kitoh et al. | 381/51 |
| 5,175,769 | | 12/1992 | Hejna, Jr. et al. | 381/34 |
| 5,327,518 | | 7/1994 | George et al. | 395/2.2 |
| 5,327,521 | * | 7/1994 | Savic et al. | 704/272 |
| 5,351,338 | | 9/1994 | Wigren | 395/2.08 |
| 5,422,977 | | 6/1995 | Patterson et al. | 704/276 |
| 5,479,564 | | 12/1995 | Vogten et al. | 395/2.76 |

(List continued on next page.)

OTHER PUBLICATIONS

A.V. Oppenheim and R.W. Schafer, "Discrete–Time Signal Processing," Prentice Hall, Englewood Cliffs, New Jersey, pp. 63–67, 835–845.

B. Sylvestre and P. Kabal, "Time–Scale Modification of Speech Using and Incremental Time–Frequency Approach with Waveform Structure Compensation," IEEE International Conference on Acoustics, Speech, and Signal Processing, Mar. 23–26, 1992, The San Francisco Marriott, San Francisco, California, pp. from I–81 to I–84.

C.J. Roehrig, "Time and Pitch Scaling of Audio Signals," *Proc. 89th AES Convention,* Los Angeles, Preprint 2954 (E–1), Sep. 1990.

(List continued on next page.)

*Primary Examiner*—David R. Hudspeth
*Assistant Examiner*—Susan Wieland
(74) *Attorney, Agent, or Firm*—Townsend and Townsend and Crew LLP

(57) ABSTRACT

A system and method for modifying a subportion of information contained in an audio, such as magnitude information, without substantially effecting the remaining information contained therein, such a phase information. An incoming audio signal is segmented into a sequence of overlapping windowed DFT representations, during an analysis step, and during a synthesis step the DFT representations are converted back to a time domain signal. Each of the DFT representations consists of a plurality of frequency components obtained during a period of time. Each of the frequency components is associated with a unique increment of the period. Subsequent to the analysis step, but before the synthesis step, the frequency components of the DFT representations are re-mapped so as to have a differing temporal relationship with respect to the increments of the period of time.

24 Claims, 5 Drawing Sheets

U.S. PATENT DOCUMENTS

| | | | | |
|---|---|---|---|---|
| 5,504,832 | | 4/1996 | Taguchi | 395/2.1 |
| 5,504,833 | | 4/1996 | George et al. | 395/2.2 |
| 5,536,902 | | 7/1996 | Serra et al. | 84/623 |
| 5,602,959 | | 2/1997 | Bergstrom et al. | 704/205 |
| 5,608,713 | | 3/1997 | Akagiri et al. | 369/124 |
| 5,625,798 | | 4/1997 | Badders et al. | 395/500 |
| 5,630,013 | | 5/1997 | Suzuki et al. | 704/216 |
| 5,712,437 | | 1/1998 | Kageyama | 84/610 |
| 5,813,993 | * | 9/1998 | Kaplan et al. | 600/544 |
| 5,930,753 | * | 7/1999 | Potmianos et al. | 704/256 |
| 5,943,429 | * | 8/1999 | Handel | 381/94.2 |

OTHER PUBLICATIONS

D. Griffin and J. Lim, "Signal Estimation from Modified Short–Time Fourier Transform," *IEEE Transactions on Acoustics, Speech, and Signal Processing,* vol. ASSP–32, No. 2, Apr. 1984.

D. Lapedes, "McGraw–Hill Dictionary of Physics and Mathematics," McGraw–Hill Book Company, p. 1053, New York 1978.

E. George and M. Smith, "Analysis –by–Synthesis/Overla-p–Add Sinusoidal Modeling Applied to the Analysis and Synthesis of Musical Tones," *J. Audio Eng. Soc.,* vol. 40, No. 6, Jun. 1992.

E. Hardam, "High Quality Time Scale Modification of Speech Signals Using Fast Synchronized Overlap Add Algorithms," *Proc. IEEE ECASSP–90,* pp. 409–412.

E. Moulines and J. Laroche, "Non–parametric techniques for pitch–scale and time–scale modification of speech," *Speech Communication 16,* pp. 175–205, (1995).

J. Dattorro, "Using Digital Signal Processor Chips in a Stero Audio Time Compressor/Expander," *Proc. 83rd AES Convention,* New York, preprint 2500 (M–6), Oct. 1987.

J. Flanagan, "Speech Analysis, Snythesis and Perception," Springer–Verlag, (pp. 167–172) New York 1972.

J. Laroche, "Autocorrelation Method for High Quality Time/Pitch Scaling," *IEEE ASSP Workshop on App. of Sig. Proc. to Audio and Acous.,* 1993.

J.L. Flanagan and R.M. Golden, "Phase Vocoder," *The Bell System Technical Journal,* Nov. 1966.

L. Beranek, "Acoustics," McGraw–Hill Book Company, INc., pp. 392–396 and pp. 402–406, New York, Toronto, London, 1954.

L. Rabiner and R. Schafer, "Digital Processing of Speech Signals," Prentice Hall, pp. 158–161, New Jersey 1978.

M. Dolson, "The Phase Vocoder: A Tutorial, " *Computer Music Journal,* vol. 10, No. 4, Winter, 1986.

M. Portnoff, "Implementation of the Digital Phase Vocoder Using the Fast Fourier Transform," *IEEE Transactions on Acoustics, Speech, and Signal Processing,* vol. ASSP–24, No. 3, Jun. 1976.

M. Portnoff, "Time–Scale Modifications of Speech Based on Short–Time Fourier Analysis," *IEEE Transactions on Acoustics, Speech and Signal Processing,* vol. ASSP–29, No. 3, Jun. 1981.

M. Portnoff, "Short–Time Fourier Analysis of Sampled Speech," *IEEE Transactions on Acoustics, Speech, and Signal Processing,* vol. ASSP–29, No. 3, Jun. 1981.

M. Puckette, "Phase–locked Vocoder," *1995 IEEE ASSP Workshop on Applications of Signal Processing to Audio and Acoustics,* New York, Oct. 1995.

R. McAulay and T. Quatieri, "Speech Analysis/Synthesis Based on Sinusoidal Representation," *IEEE Transactions on Acoustics, Speech and Signal Processing,* vol. ASSP–34, No. 4, Aug. 1986.

R. Suzuki and M. Misaki, "Time–Scale Modification of Speech Signals Using Cross–Correlation Functions," *IEEE Trans. Consumer Elec.,* 38(3):pp. 357–363, Aug. 1992.

S. Roucos and A.lM. Wilgus, "High Quality Time–Scale Modifications of Speech," *Proc. IEEE ICASSP–85,* Tampa, pp. 493–496, Mar. 1985.

T. Parsons, "Voice and Speech Processing," McGraw–Hill, Inc., pp. 219–222, New York, 1987.

T. Quatieri and R McAulay, "Phase Coherence in Speech Reconstruction for Enhancement and Coding Applications," ICASSP—89 International Conference on Acoustics, Speech, and Signal Processing, Glasgow, Scotland, May 1989.

T. Quatieri and R McAulay, "Speech Transformations Based on Sinusoidal Representation," *IEEE Transactions on Acoustics, Speech and Signal Processing,* vol. ASSP–34, No. 6, Dec. 1986.

* cited by examiner

SOUND MODIFICATION EMPLOYING SPECTRAL WARPING TECHNIQUES

BACKGROUND OF THE INVENTION

In one embodiment, the present invention relates to a method and apparatus for modifying an audio signal employing table lookup to perform non-linear transformations of the Short Time Fourier Transform of the audio signal.

Reproduction and modification of audio signals has posed a significant challenge for many years. Early attempts to accurately reproduce audio signals had various drawbacks. For example, an early attempt at reproducing speech signals employed linear predictive (LP) modeling, described by J. Makhoul, "Linear Prediction: A Tutorial Review," *Proc. IEEE,* vol. 63, pp. 561–580, April 1975. In this approach, the speech production process is modeled as a linear time-varying, all-pole vocal tract filter driven by an excitation signal representing characteristics of the glottal waveform. However, LPC is inherently constrained by the assumption that the vocal tract may be modeled as an all-pole filter. Deviations of an actual vocal tract from this ideal results in an excitation signal without the purely pulse-like or noisy structure assumed in the excitation model. This results in reproduced speech having noticeable and objectionable distortions.

Frequency-domain representations of audio signals, such as speech, overcome many of the drawbacks associated with linear predictive modeling. Frequency domain representation of audio signals is based upon the observations that much of the speech information is frequency related and that speech production is an inherently non-stationary process. As discussed in the article by J. L. Flanagen and R. M. Golden, "Phase Vocoder," *Bell Sys. Tech. J.,* vol. 45, pp. 1493–1509, 1966, a short-time Fourier transform (STFT) formulation of an audio signal may be employed to parameterize speech production information in a manner very similar to LP modeling. This is commonly referred to as the digital phase vocoder (DPV) and is capable of performing speech modifications without the constraints of LPC. However, the DPV is computationally intensive, limiting its usefulness in real-time applications.

To reduce the computational intensity of the DPV, another approach employs the discrete short-time Fourier transform (DSTFT), implemented using a Fast Fourier Transform (FFT) algorithm. This enables modeling of an audio signal as a discrete signal x(n) that can be reconstructed from a sequence X (k,m) of its windowed Discrete Fourier Transforms (DFTs) by applying an inverse Discrete Fourier Transform to each DFT and then properly weighting and overlap-adding the sequence of inverse DFTs $$x(n) = \sum_{m=-\infty}^{\infty} W(\mathrm{mL}-n) \sum_{k=0}^{n-1} X(k, m) e^{j\frac{2\pi}{N}kn} \tag{1}$$

where $$X(k, m) = \sum_{n=-\infty}^{\infty} x(n) W(\mathrm{mL}-n) e^{-j\frac{2\pi}{N}kn} \tag{2}$$

and L is the spacing between successive DFTs. It is also well known that modified versions of x(n) can be obtained by applying the above reconstruction formula to a sequence of modified DFTs. Due to the success of the DSTFT in reducing the computational complexity, many prior art methods have been employed to modify the differing audio information contained therein. For example, M. R. Portnoff, in "Time-Scale Modification of Speech Based on Short-Time Fourier Analysis," IEEE Trans. Acoustics, Speech, and Signal Proc., pp. 374–390, vol. ASSP-29, No. 3 (1981) describes a technique for reducing phase distortions which arise when employing the modified DSTFT.

U.S. Pat. No. 4,856,068 to Quatieri, Jr. et al. describes an audio pre-processing method and apparatus to achieve a flattened time-domain envelope to satisfy peak power constraints. Specifically, an audio signal, representing a speech waveform, is processed before transmission to reduce the peak-to-RMS ratio of the waveform. The system estimates and removes natural phase dispersion in the frequency component of the speech signal. Artificial dispersion based on pulse compression techniques is then introduced with little change in speech quality. The new phase dispersion allocation serves to pre-process the waveform prior to dynamic range compression and clipping. In this fashion, deeper thresholding may be accomplished than would otherwise be the case on the original speech waveform.

U.S. Pat. No. 4,885,790 to McAulay et al. describes an analysis/synthesis technique for processing an audio signal, such as a speech waveform which characterizes the speech waveform by the amplitudes, frequencies and phases of component sine waves. These parameters are estimated from a short-time Fourier transform, with rapid changes in highly-resolved spectral components being tracked using the concept of "birth" and "death" of the underlying sine waves. The component values are interpolated from one frame to the next to yield a representation that is applied to a sine wave generator. The resulting synthetic waveform preserves the general waveform shape.

There exists a need, however, for computationally efficient approaches for selectively modifying a subportion of information contained in a DSTFT representation of audio signals without substantially effecting the remaining audio information contained therein.

SUMMARY OF THE INVENTION

The present invention provides a system and method which increases the computational efficiency of modifying an audio signal while allowing selectively modifying a subportion of information of the same, such as magnitude information, without substantially effecting the remaining audio information contained therein, such as phase information. An incoming audio signal is segmented into a sequence of overlapping frames as discussed by Mark Dolson et al. in U.S. patent application Ser. No. 08/745,930, assigned to the assignee of the present application, and incorporated by reference herein. Specifically, the audio signal is converted from a time-domain signal to a frequency-domain signal by forming a sequence of overlapping windowed DFT representations, during an analysis step. Each of the DFT representations consists of a plurality of frequency components obtained during a period of time. The frequency components typically have a complex value that includes magnitude information and phase information of the audio signal. Each of the plurality of frequency components is associated with a unique frequency among a sequence of frequencies. The audio signal is converted back into a time-domain signal during a synthesis step that follows the analysis step. Subsequent to the analysis step, but before the synthesis step, the frequency components of the DFT representations are re-mapped so that magnitudes are applied to a different frequency.

In accordance with a first embodiment of the present invention, a method for modifying an audio signal includes the step of capturing a frequency domain representation of successive time segments of the audio signal, defining a plurality of frequency domain representations, each of which includes a plurality of frequency components stored in input bins. Each of the plurality of frequency components has a complex value associated therewith comprising a first magnitude and a first phase. Thereafter, at a modifying step, the frequency components are modified by using a bin number of the input bin associated with the frequency component to be modified as an index to a look-up table that provides a bin number of an alternate warping bin holding a second magnitude to be used to replace the first magnitude. The modification is achieved by normalizing the magnitude of the frequency component to be modified, defining a normalized value, and obtaining a magnitude of the complex value associated with the warping bin and multiplying this magnitude value by the normalized value. In this fashion, the magnitude information of the audio signal may be modified without affecting the phase information, employing a minimal number of steps, thereby increasing the computational efficiency of the process.

In other embodiments, an additional step may be included, before the modifying step, of varying the second magnitude associated with the warping bin so as to be different for a subset of the successive time segments, e.g., by selectively multiplying the second magnitude by a scalar. These and other embodiments are described more fully below.

DESCRIPTION OF SPECIFIC EMBODIMENTS

Figure 1:
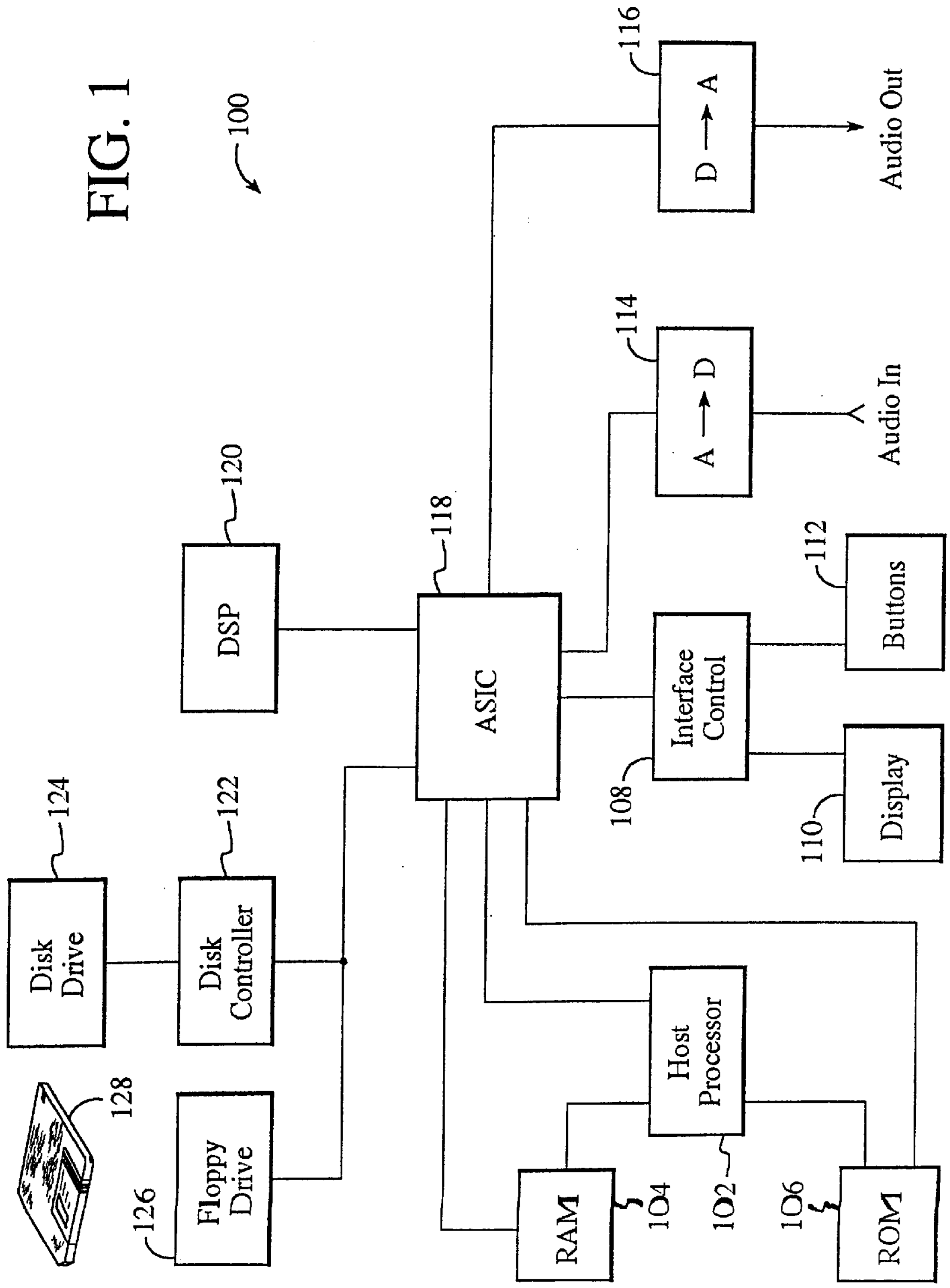
FIG. 1 depicts a signal processing system suitable for implementing the present invention.

FIG. 1 depicts a signal processing system 100 suitable for implementing the present invention. In one embodiment, signal processing system 100 captures sound samples, processes the sound samples in the time and/or frequency domain, and plays out the processed sound samples. The present invention is, however, not limited to processing of sound samples but also may find application in processing, e.g., video signals, remote sensing data, geophysical data, etc. Signal processing system 100 includes a host processor 102, RAM 104, ROM 106, an interface controller 108, a display 110, a set of buttons 112, an analog-to-digital (A-D) converter 114, a digital-to-analog (D-A) converter 116, an application-specific integrated circuit (ASIC) 118, a digital signal processor 120, a disk controller 122, a hard disk drive 124, and a floppy drive 126.

In operation, A-D converter 114 converts analog sound signals to digital samples. Signal processing operations on the sound samples may be performed by host processor 102 or digital signal processor 120. Sound samples may be stored on hard disk drive 124 under the direction of disk controller 122. A user may request particular signal processing operation using button set 112 and may view system status on display 110. Once sounds have been processed, they may be played out by using to D-A converter 116 to convert them back to analog. The program control information for host processor 102 and DSP 120 is operably disposed in RAM 104. Long term storage of control information may be in ROM 106, on disk drive 124 or on a floppy disk 128 insertable in floppy drive 126. ASIC 118 serves to interconnect and buffer between the various operational units. DSP 120 is preferably a 50 MHz TMS320C32 available from Texas Instruments. Host processor 102 is preferably a 68030 microprocessor available from Motorola.

For certain applications, signal processing system 100 will divide a sound signal, or other time domain signal into a series of possibly overlapping frames, obtain a windowed DFT for each frame, and resynthesize a time domain signal by applying the inverse DFT to the sequence of windowed DFT representations. The DFT for each frame is obtained by:

$$X(k,m)=\sum_{n=-\infty}^{\infty}x(n)W(\mathrm{mL}-n)e^{-j\frac{2\pi}{N}kn} \tag{3}$$

where L is the spacing between frames, k is the frequency channel within a particular DFT, and m identifies the frame within the series. W(mL–N) is any window function as known to those of skill in the art. The resynthesized time domain signal is obtained by:

$$\hat{x}(n)=\sum_{m=-\infty}^{\infty}W(\mathrm{mL}-n)\sum_{k=0}^{n-1}X(k,m)e^{j\frac{2\pi}{N}kn} \tag{4}$$

One such application is time scaling where the spacing, L, between the frames is changed for the synthesis step so that the resynthesized time domain signal is compressed or expanded as compared to the original time domain signal. Other applications involve changing the frequency positions of individual DFT channels prior to synthesis. The present invention provides a system and method for increasing the computational efficiency of modifying an audio signal while allowing selectively modifying a subportion of information of the same, such as magnitude information, without substantially effecting the remaining audio information contained therein, such as phase information.

Figure 2:
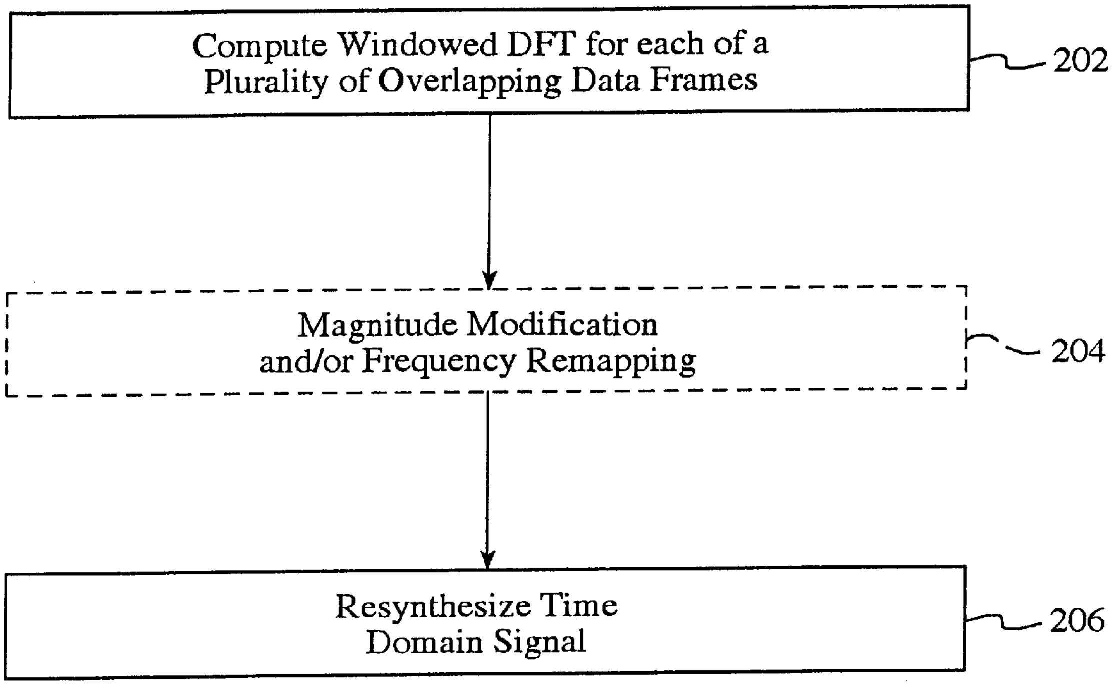
FIG. 2 is a flowchart describing steps of processing a sound signal in accordance with one embodiment of the present invention.
Figure 3:
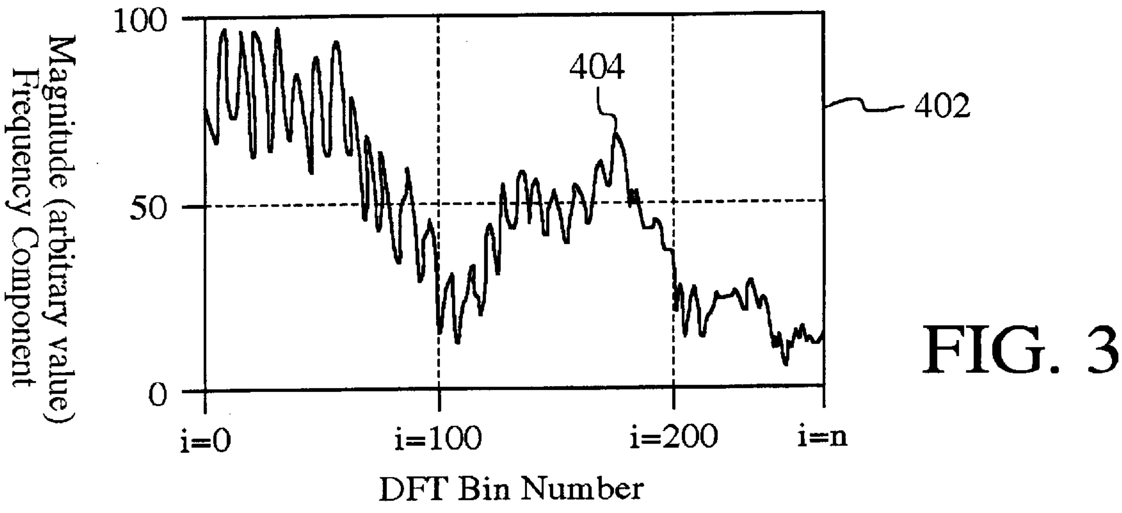
FIG. 3 is a graph showing a frequency-domain representation of an audio signal.

FIG. 2 is a flowchart describing steps of modifying a subportion of an audio signal while preserving phase information associated therewith. FIG. 2 assumes that the audio signal has been converted to a sequence of samples that are stored in a first group of addresses (not shown) in electronic memory, e.g., RAM 104. At step 202, signal processing system 100, shown in FIG. 1, divides the sound signal into a series of overlapping data frames and applies a windowed DFT to each overlapping data frame. A sequence of DFT representations is therefore obtained, one of which is shown as DFT frame 402 in FIG. 3. The DFT frame 402 is stored in a second subset of addresses in the RAM 104, shown in FIG. 1, as a plurality of frequency components, shown in FIG. 3 as curve 404. Each of the frequency components 404 typically has a complex value that includes magnitude information and phase information of the input audio signal, and each of the plurality of frequency components is associated with a unique frequency among a sequence of frequencies associated with the DFT frame, defining a group DFT bins, $i_0$–$i_n$. In this fashion, step 202 shown in FIG. 2, captures a frequency domain representation of the input audio signal.

Figure 4:
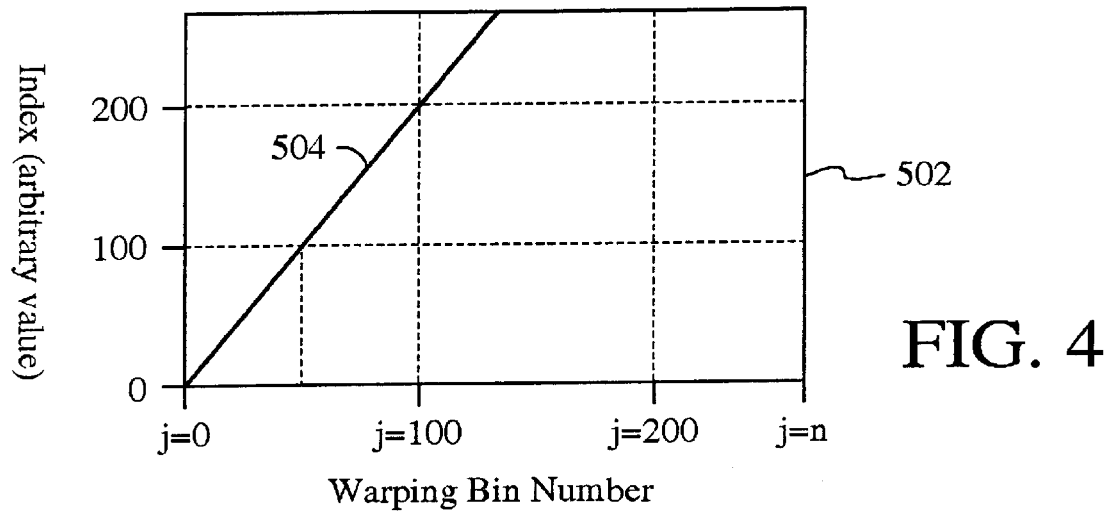
FIG. 4 is a graph showing a representation of a linear warping function in accordance with the present invention.

Referring to FIGS. 1, 2 and 4, the ROM 106 stores a warping function 502 as a sequence of warping bin numbers, shown as line 504, located in multiple address locations, e.g., indices $j_0$–$j_n$. Typically, the indices, $j_0$–$j_n$, are arranged so that there is a one-to-one correspondence with the sequence of DFT bins $i_0$–$i_n$, and the warping bin number stored at each index, $j_0$–$j_n$, identifies one of the DFT bins $i_m$ among the sequence of DFT bins $i_0$–$i_n$. At step 204, the processor 102 operates on the frequency components 404 using the warping bin numbers 504 so as to remap the magnitudes in the DFT bins $i_0$–$i_n$. This is achieved by the processor 102 using the index associated with one of the DFT bins $i_m$ to read out the corresponding warping bin number w at locations $j_m$ in the warping function 502. Thereafter, the magnitude of the DFT bin corresponding to index $i_m$ is modified to have the magnitude of the DFT bin corresponding to index $i_w$. In this fashion, the DFT bin numbers $i_0$–$i_n$, are used to index a lookup table, and the warping bin numbers stored at these indices identify the DFT bins whose magnitudes are to be substituted for DFT bins $i_0$–$i_n$. In the simplest case, the warping function defines a line having unity slope, e.g., w=j, providing an output signal (not shown) that is identical to the input signal, i.e., no sound modification is performed. However, with the warping function 502 deviating from a line of unity slope, warping of the DFT frame 402 occurs.

Figure 5:
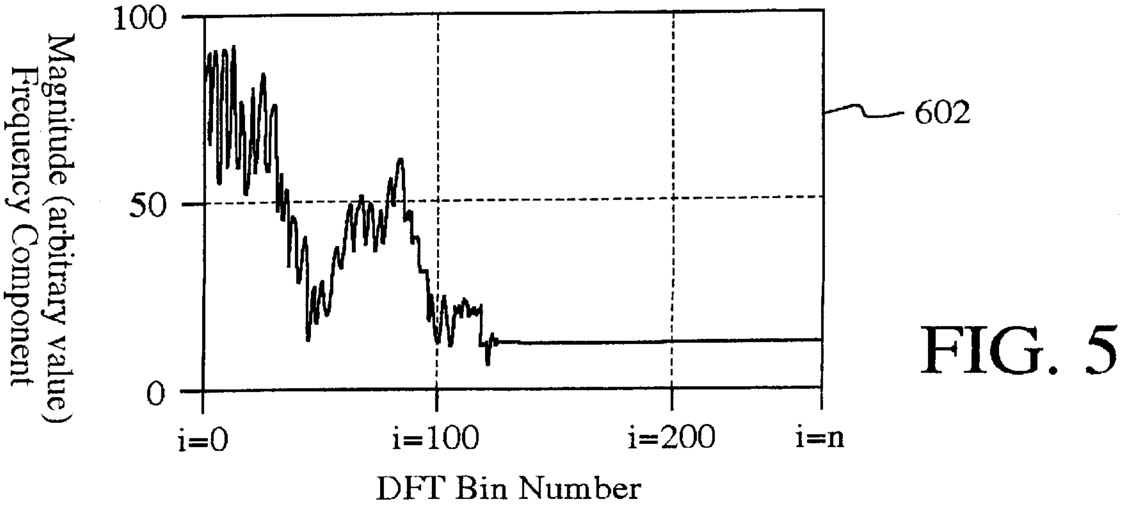
FIG. 5 is a graph showing the frequency domain representation shown above in FIG. 3 and modified according to the linear warping function shown above in FIG. 4.

For example, as shown in FIG. 4, the warping function 502 has a plurality of warping bin numbers 504 defining a line having a slope of 2. With this type of warping function, the DFT frame 402 is mapped so as to provide the output function 602 shown in FIG. 5. The mapping for the frequency components 404 for each of the DFT bins $i_0$–$i_n$ is described with respect to DFT bin 50. Examining the warping function 502, it is observed that index 50 contains a warping bin value 100.Thus, the magnitude of DFT bin 100 is applied to DFT bin 50. The same procedure is applied for all DFT bins, $i_0$–$i_n$, up to bin 128, wherein the warping function 502 reaches value 256 and stays there. The result of the aforementioned modifying step 204 is that the frequency components are scaled so as to fit into the first 128 DFT bins, forming the modified output DFT frame 602. As can be seen, the function defined by the DFT bins following bin 128, in the modified output DFT frame, have a zero slope. In other words, the magnitude of bin 256 for this example is applied to all DFT bins above bin 128.

To preserve pitch information associated with the DFT frame 402, it is important that the aforementioned mapping affects only the magnitudes of the frequency components. To that end, each of the bins of the DFT frame are normalized to provide a normalized value, and a magnitude value is obtained for each of the warping bin numbers 504. Thereafter, the normalized values and magnitudes are multiplied together as follows:

$$|i_w| * \frac{i_m}{|i_m|} \tag{5}$$

where $|i_w|$ represents the magnitude of the bin referenced by the warping bin number 504, and $i_m/|i_m|$ represents the normalized value of complex bin $i_m$ in the input DFT frame 402. The operation shown in equation (5) applies the magnitude information identified by the warping bin numbers while preserving the phase information of the frequency components 404. The result of the aforementioned operations is a scaling of the signals magnitudes stored in the first set of bins downwardly by an octave, without affecting the signal's phase information. In this manner, only the bin magnitudes are affected. Therefore, most of the pitch information of the input signal, which is expressed by the phase of the DFT frame 402, is preserved. The overall impression is of a low-pass filtering operation being performed on the DFT frame 402. Once the magnitude information has been modified, at step 206 the time domain signal is resynthesized by applying the inverse DFT to each DFT representation in the sequence and properly weighting and overlap-adding the sequence of inverse DFTs. For time scaling applications, the spacing L is adjusted to provide the desired time compression or expansion, as described in U.S. patent application Ser. No. 08/745,930 to Mark Dolson et al., mentioned above.

Figure 6:
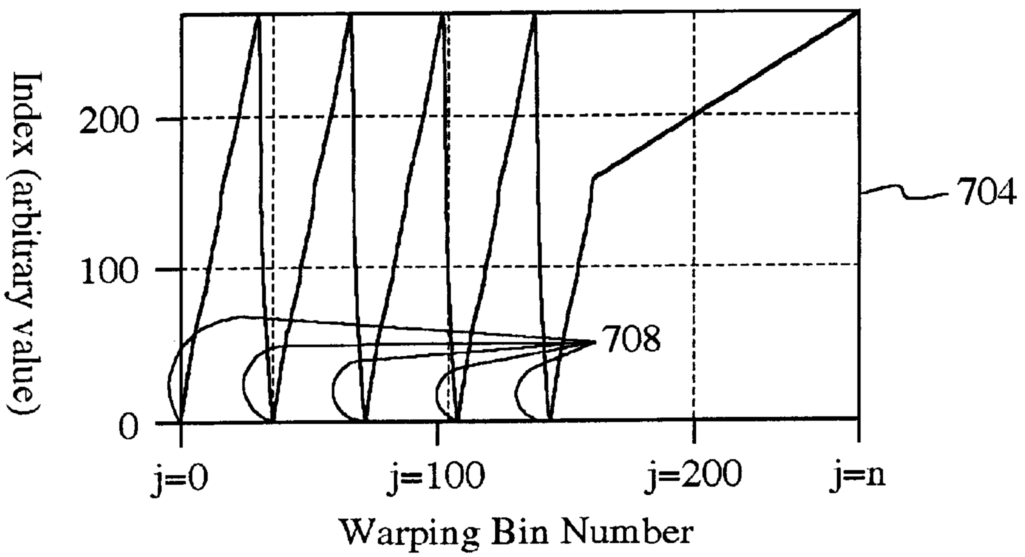
FIG. 6 is a graph showing a frequency-domain representation of a more complex warping function in accordance with the present invention.
Figure 7:
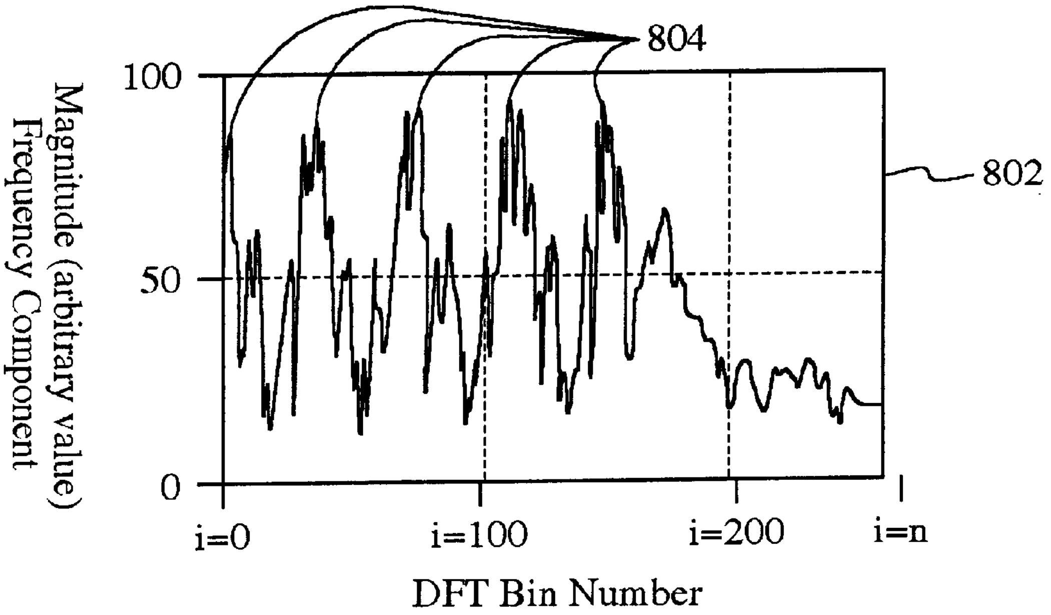
FIG. 7 is a graph showing the frequency domain representation shown above in FIG. 3 and modified according to the warping function shown above in FIG. 6.

Although the warping discussion mentioned above has been described as linear, any warping function may be employed, as desired. The sawtooth warping function 704 shown in FIG. 6, for example may be applied to an input signal, following the same process as discussed above with respect to FIGS. 3–5. The result is a modified spectrum 802, shown in FIG. 7, where the entire input spectrum has been scaled to fit into the first 25 or so audio bins. Then, the input spectrum is read out in reverse order and scaled to fit into the next 10 or so audio bins. The order is reversed because in this region 706 of the warping function, shown in FIG. 6, the successive indices have decreasing values. In the modified audio signal 802, five prominent peaks 804 are found, corresponding to the five troughs 708 of the warping function. This results from the fact that low bin indices in the input signal have relatively higher energy than the high-frequency bins. The resulting sound will have five distinct frequency bands of high energy and may have tonal characteristics based on these frequency concentrations. Above audio bin 170, however, the output signal returns to the reference line having unity slope. The modified audio signal 802 above bin 170 is identical to the input audio signal.

Although the aforementioned warping functions have been described as being a steady state function, i.e., applied to each successive frame of the audio signal, the warping functions may be varied in time. In this fashion, the warping bin numbers associated with the indices, $j_0$–$j_n$, are varied so as to have different values for a subset of successive DFT frames 402. For example, the warping function may be varied so that each of the warping bin numbers associated with one of the indices, $j_m$, decrements at a predetermined rate until the index reaches a minimum value, such as zero. Thereafter, the warping bin number associated with the indices, $j_m$, increments to a maximum value. The end result is that of the warping bin number moving back and forth between minimum and maximum values. In this fashion, a computationally economical means is available for applying complex time-varying manipulations to an arbitrary input audio signal. The only requirements are sufficient processing power to perform analysis and synthesis (preferably in real time) and to compute the time-varying warp function.

Additional variations to the warping function may be obtained by shrinking and stretching the warping function in time, i.e., along the bin axis. For example, the slope of a warping function having unity slope may varied by linear interpolation to have a slope, for example, of ½. The effect is to stretch the audio input signal's magnitude spectrum by a factor of two. By shrinking the same linear mapping to have a slope of 2, the input signal's magnitude spectrum is scaled down by an octave (as described above). Modulation of the slope of the warping function, may impart major changes to the sound. Similar transformations can be applied to more complex curves. In this case, the qualitative effect is to make the output sound more low-pass filtered if the table is shrunk and brighter (more high-frequency content) if the table is expanded. Additionally, linear interpolation may be performed between separate warping functions. In this fashion, one or both of the functions in the first and second groups of warping bins may be non-linear. For example, one of the functions may be linear having unity slope, with the remaining warping function being non-linear. By linearly interpolating between these two warping functions, control of the 'depth' of the warping effect on the input audio signal may be achieved.

It is possible to have varying control of the depth, stretch or other parameters via an Attack/Decay/Sustain/Release (ADSR) envelope generator, or by an arbitrary 'trajectory memory' (not shown). The trajectory memory has the advantage of being more flexible, in that the shape of the envelope can be completely arbitrary, rather than being limited to some fixed family of shapes. By applying these trajectories to the depth parameter, timbral modifications of a sound's timbre result (for example, a piano note can be manipulated to sound more like a bullet ricochet).

Additionally, the frequency components associated with the modified audio signal may be selectively nulled. This is particularly useful to remove undesirable sonic artifacts, such as 'ring modulation', which may occur due to the presence of negative slopes in the warping function, e.g., region 706 shown in FIG. 6. Specifically, the negative slopes may produce a spectral inversion operation where higher input frequencies are mapped to lower output frequencies and vice versa. To reduce this effect, an intermediate processing stage is implemented where some or all of the segments having a negative slope are tagged with a distinct value. Whenever the map function has a negative slope, the corresponding section of the input spectrum is silenced. This is achieved by having any DFT bin whose corresponding map entries have been replaced with the tag value being set to zero. In this fashion, only positive-sloped segments in the mapping function contribute to the output DFT frame.

It may also be desirable to limit the frequency-domain discontinuity created by the warping process, since these discontinuities can result in time-domain aliasing. To reduce this effect, a smoothing operation can be performed on the warping function prior to applying it.

Figure 8:
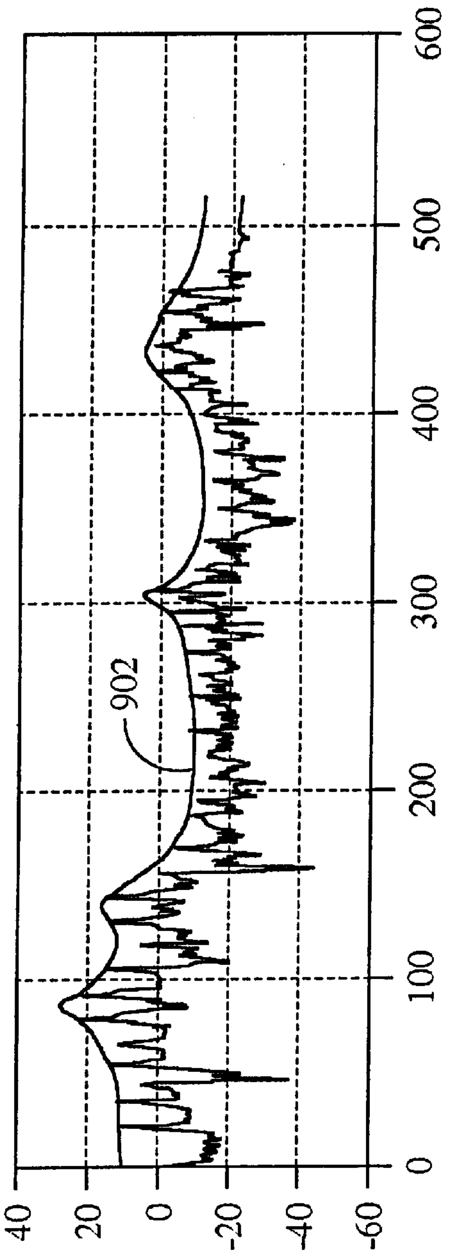
FIG. 8 is a graph showing a frequency domain representation of a speech signal.
Figure 9:
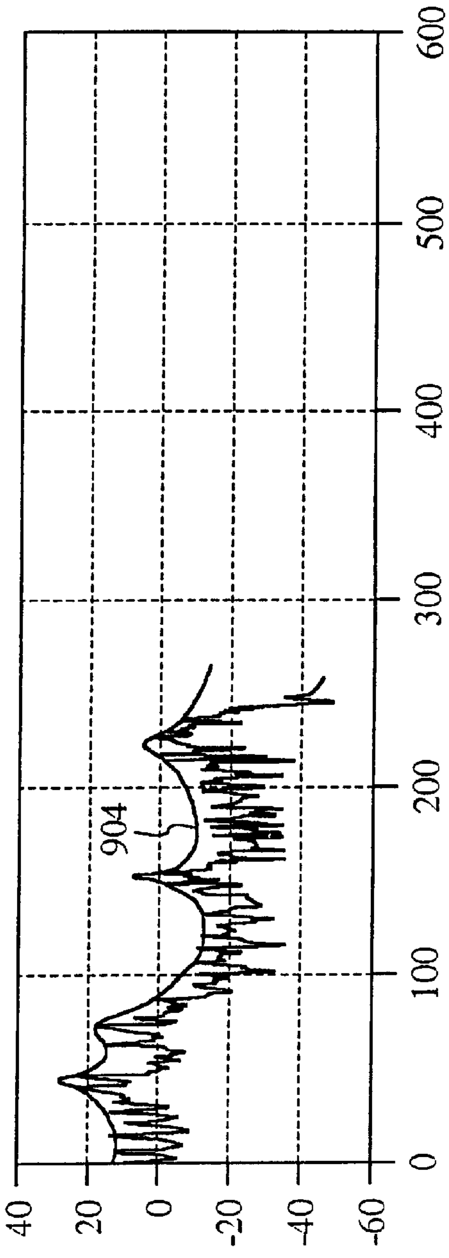
FIG. 9 is a graph showing distortion in the speech signal of FIG. 8 due to pitch-shift of the same.

The present invention may also be employed as a formant preserving itch-shifting device of a speech signal, shown as 902 in FIG. 8, that has been sampled and mapped to a particular note on a MIDI keyboard. Typically, when the aforementioned signal is pitch shifted via sample rate conversion, the spectral envelope is distorted resulting in an unnatural timbre, shown as 904 in FIG. 9. It has been found that by linearly re-mapping an input signal having a slope directly proportional to the MIDI note number, the natural quality of the voice data can be restored. Specifically, the slope of the warping function 504, shown in FIG. 4, can be represented as $2^{input\ note\ number/12}/2^{base\ note\ number/12}$. When the base note (for example, note number 60) is played, the slope is one and the original voice data is played. When, for example, a note one octave lower is played, the slope computed is $2^{48/12}/2^{60/12}=½$. Hence, DFT bin 20 would be given the magnitude of input bin 10 and so on. The pitch of the signal will be lowered by an octave (recall that the phase information of the pitch shifted signal is preserved), but the distortions of the spectral envelope (formant information) will be undone by the corresponding stretching operation so performed. Several useful control structures have been implemented which increase the effectiveness of the technique, especially in a real-time control (i.e. performance) environment. Typically, a MIDI continuous controller would be mapped to one or more of the preceding control variables to enhance the expressive possibilities of the technique. Of course, any modulation source as implemented in most common music synthesizers (LFO, Envelope, etc) can also be used without loss of generality.

Although the above examples have been described as being used to vary the bin magnitude of an audio spectrum, it is possible to the modify the complex values directly without performing the magnitude normalization described. In this fashion, both the magnitude and phase of the complex values in the input bin are modified so as to include, in the output bin, the magnitude and phase values of the warping bins. Since this approach does not preserve phase information, it has very different characteristics than the phase-preserving technique described above. For example, the stretching operations will actually change the pitch of sine wave inputs, since both the magnitude and phase spectra are modified. Various useful modifications of the timbre of a sound can be achieved using this technique, and the computational cost is less, since no magnitude computations are required.

Finally, it may be possible to combine the phase-preserving and phase-swapping approaches in such a way as to preserve higher fidelity while still allowing complex modifications. For example, when shifting the magnitude spectrum, new phase information could be computed that would make the DFT frame consistent with it's own bin magnitudes. Therefore, the scope of the of the invention should not be determined by the description as set forth above, but should be interpreted based upon the pending claims and their full scope of equivalents.

What is claimed is:

1. A method of applying a transformation to a digital audio signal comprising the steps of:

capturing a frequency domain representation of a first time segment of said digital audio signal, said frequency domain representation comprising a plurality of bins, each said bin holding a complex value having a first magnitude and a first phase;

modifying said first magnitude of a first selected bin of said plurality of bins by using a bin number of said first selected bin as an index to a look-up table that provides a bin number of a second selected bin holding a second magnitude to be used to replace said first magnitude of said first selected bin;

repeating said modifying step for a plurality of selected bins of said plurality of bins; and converting said digital audio signal into an analog audio signal in an digital-to-analog converter.

2. The method as recited in claim 1 wherein said modifying step comprises preserving a phase of said first selected bin while modifying said magnitude.

3. The method as recited in claim 1 wherein values stored at adjacent locations of said lookup table define a slope and further including a step, following said modifying step, of attenuating the said second magnitudes associated with adjacent bins of said plurality of bins having a slope of a predetermined value.

4. The method as recited in claim 1 wherein said second selected bin has associated therewith said second magnitude and a second phase, with said modifying step comprising the steps of normalizing said complex value associated with said first selected bin, defining a normalized value, and ascertaining a product of said normalized value and said second magnitude.

5. The method as recited in claim 1 wherein said second selected bin has associated therewith said second magnitude and a second phase, with said modifying step comprising replacing said first magnitude with said second magnitude and replacing said first phase with said second phase.

6. The method as recited in claim 1 wherein said look-up table includes multiple indices and stores a sequence of bin numbers, with each of said bin numbers of said sequence corresponding to one of said plurality of bins and further including the step, before said modifying step, of multiplying one of said bin numbers by a scalar, thereby referencing a different one of said plurality of bins and producing a different said second magnitude.

7. The method as recited in claim 5 wherein said capturing step includes capturing a frequency domain representation of successive time segments of said digital audio signal and further including a step, prior to said modifying step, of varying said scalar so as to be different for a subset of said successive time segments, defining successive bin numbers and second magnitudes.

8. The method as recited in claim 6 wherein said varying step comprises an interpolation between a first and second set of bin numbers.

9. The method as recited in claim 6 wherein said successive bin numbers define a slope, with said modifying step comprising the step of attenuating magnitudes associated with successive bin numbers having a slope of a predetermined value.

10. A method of applying a transformation to a digital audio signal comprising the steps of:

capturing a frequency domain representation of successive time segments of said digital audio signal, defining a plurality of frequency domain representations each of which includes a plurality of bins, with each of said plurality of bins having a complex value associated therewith comprising a first magnitude and a first phase;

modifying said first magnitude of a first selected bin of said plurality of bins while preserving said first phase of said first selected bin by using the bin number of said first selected bin as an index to a look-up table that provides a second bin number of a second selected bin having a second magnitude to be used to replace said first magnitude of said first selected bin;

repeating said modifying step for a plurality of selected bins of said plurality of bins; and converting said digital audio signal into an analog audio signal in an digital-to-analog converter.

11. The method as recited in claim 10 wherein said second selected bin holds a second complex value having said second magnitude and a second phase, with said modifying step comprising the steps of normalizing said complex value associated with said first selected bin, defining a normalized value, and ascertaining a product of said normalized value and said second magnitude.

12. The method as recited in claim 10 further including a step, before said modifying step, of varying said second bin number associated with said second selected bin so as to be different for a subset of said successive time segments, referring to different successive bin magnitudes.

13. The method as recited in claim 12 wherein said varying step includes selectively multiplying said second bin number by a scalar.

14. The method as recited in claim 13 wherein said successive bin numbers associated with each bin of said plurality of bins define a slope, and further including the step, following said modifying step, of attenuating magnitudes associated with successive bin numbers having a slope of a predetermined value.

15. The system as recited in claim 14 wherein the slope of successive bin numbers in said look-up table defines a formant correcting characteristic, such that said slope is decreased as notes below a base note are played and slope is increased as notes above a base note are played.

16. The method as recited in claim 10 wherein said additional selected bins have associated therewith said second magnitude and a second phase, with said code to modify comprising code to replace said first magnitude with said second magnitude and replace said first phase with said second phase.

17. A signal processing system configured to process a digital audio signal comprising:

a processing unit; and a memory holding digital data corresponding to said digital audio signal;

said memory storing code to be operated on by said processing unit, said code including means for capturing a frequency domain representation of a first time segment of said digital audio signal, said frequency domain representation comprising a plurality of bins, each said bin holding a complex value having a first magnitude and a first phase; means for modifying said first magnitude of a first selected bin of said plurality of bins while preserving a phase of said first selected bin by using a bin number of said first selected bin as an index to a look-up table that provides a bin number of a second selected bin holding a second magnitude to be used to replace said first magnitude of said first selected bin; and a digital-to-analog converter for converting said digital audio signal into an analog audio signal.

18. The system as recited in claim 17 wherein said capturing means captures multiples frequency domain representations each pair of which is associated with successive time segments of said digital audio signal, with said code further including means for varying said second magnitude associated with said second selected bin so as to be different for a subset of said successive time segments, defining successive bin magnitudes.

19. The system as recited in claim 17 wherein modifying means modifies said first magnitude of each of a subset of said plurality of bins.

20. The system as recited in claim 17 wherein the first magnitude associated with adjacent bins of said plurality of bins define a slope, with said code further including means for attenuating the magnitudes associated with adjacent bins of said plurality of bins having a slope of a predetermined value.

21. A computer program product that controls a computer to transform a digital audio signal, comprising:

code to capture a frequency domain representation of a first time segment of said digital audio signal, said frequency domain representation comprising a plurality of bins, each said bin holding a complex value having a first magnitude and a first phase; and code to modify said first magnitude of multiple selected bins of said plurality of bins by using a bin number of said multiple selected bins as an index to a look-up table that provides bin numbers of additional selected bins holding a second magnitude to be used to replace said first magnitude of said multiple selected bins;

wherein said modified digital audio signal is converted into an analog audio signal in a digital-to-analog converter.

22. The computer program product as recited in claim 21 wherein values stored at adjacent locations of said lookup table define a slope and further including code to attenuate the said second magnitudes associated with adjacent bins of said plurality of bins having a slope of a predetermined value.

23. The computer program product as recited in claim 20 wherein said additional selected bins have associated therewith said second magnitude and a second phase, with said code to modify comprising code to normalize said complex value associated with said first selected bin, defining a normalized value, and ascertaining a product of said normalized value and said second magnitude.

24. The computer program product as recited in claim 21 wherein said code to modify further includes code to preserve a phase of said multiple selected bins when modifying said magnitude.

* * * * *